Patented Dec. 27, 1927.

1,654,025

UNITED STATES PATENT OFFICE.

JAMES WRIGHT VAN METER, OF SAN ANTONIO, TEXAS, ASSIGNOR TO B. ALEXANDER SINGER, OF WASHINGTON, DISTRICT OF COLUMBIA.

COMPOSITION OF MATTER AND METHOD OF PRODUCING THE SAME.

No Drawing. Application filed July 12, 1924. Serial No. 725,676.

This invention is an improved composition of matter and method of producing the same and is specifically chlorinated vegetable juice such as the juice of the water hyacinth and other aquatic plants, the object of the invention being to provide an improved method for preserving the juice of the water hyacinth, to prevent it from evaporating, to form it into a semisolid to adapt it for industrial purposes, such as bleaching, laundering, and for other industrial purposes, in which chlorine is used.

In accordance with my invention I take the juice of a plant such as for instance, the water hyacinth, in substantially fresh state and incorporate therewith about 8 per centum of sodium silicate or other suitable silicate of an alkali metal, by volume, as by stirring or otherwise.

I then subject the mass to the action of a jet of chlorine under pressure, introduced thereinto, and continue so to do until the juice has taken up as much of the chlorine as it will absorb.

The reaction of the chlorine on the silicate of soda causes it to be converted into siliconoxide, which is a semisolid or gelatinous mass which may be used for many useful purposes, such as for bleaching, laundering, as an antiseptic, and as a salve for medicinal purposes, the chlorine remaining as an active agent. The composition of matter thus produced can be readily packed and transported and can be placed in collapsible tubes and used therefrom in small quantities as may be desired.

The consistency of the product can be varied as desired by varying the proportion of sodium silicate employed in the process. The chlorine can be incorporated also in any other suitable manner than the one hereinbefore stated.

Having thus described my invention, I claim:

1. A composition of matter consisting of the juice of an aquatic plant, a silicate of an alkali metal and chlorine.

2. A composition of matter consisting of the juice of an aquatic plant, sodium silicate and chlorine.

3. A composition of matter consisting of water hyacinth juice, a silicate of an alkali metal and chlorine.

4. A composition of matter consisting of water hyacinth juice, sodium silicate and chlorine.

5. The herein described method of treating sodium silicate consisting in incorporating chlorine therewith in the presence of juice of an aquatic plant.

6. The method of treating water hyacinth juice by incorporating therewith a silicate of an alkali metal and then subjecting the same to the action of chlorine to convert the same into a gelatinous mass.

7. The method of chlorinating juice of an aquatic plant consisting in incorporating therewith sodium silicate substantially in the proportions hereinbefore described, and then subjecting the same to the action of chlorine to convert the same into a gelatinous mass.

8. The herein described method of chlorinating the juice of an aquatic plant consisting in incorporating therewith a silicate of an alkali metal substantially in the proportions hereinbefore described and then subjecting the same to the action of chlorine to convert the same into a gelatinous mass.

In witness whereof I affix my signature.

JAMES WRIGHT VAN METER.